E. C. SWARTOUT.
TWINE TREATING DEVICE.
APPLICATION FILED JUNE 3, 1919.
1,334,190.
Patented Mar. 16, 1920.
2 SHEETS—SHEET 1.
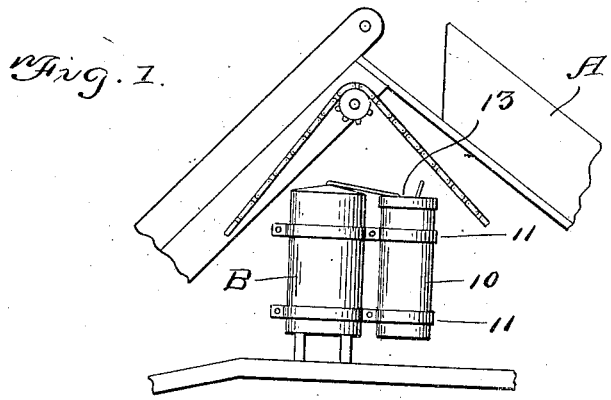
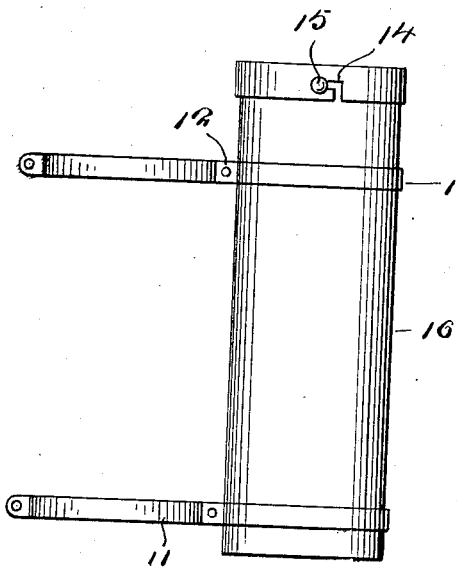
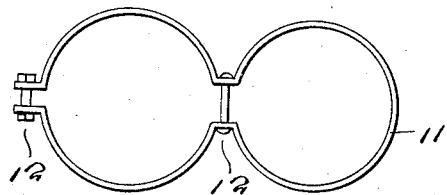
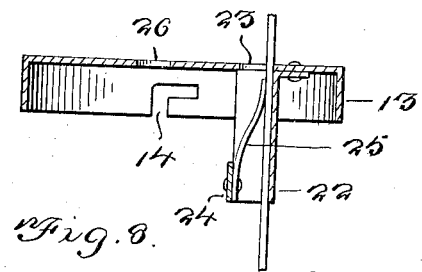
Inventor
E. C. Swartout
By Victor J. Evans
Attorney
Witnesses
E. R. Ruppert E. C. SWARTOUT.
TWINE TREATING DEVICE.
APPLICATION FILED JUNE 3, 1919.
1,334,190.
Patented Mar. 16, 1920.
2 SHEETS—SHEET 2.
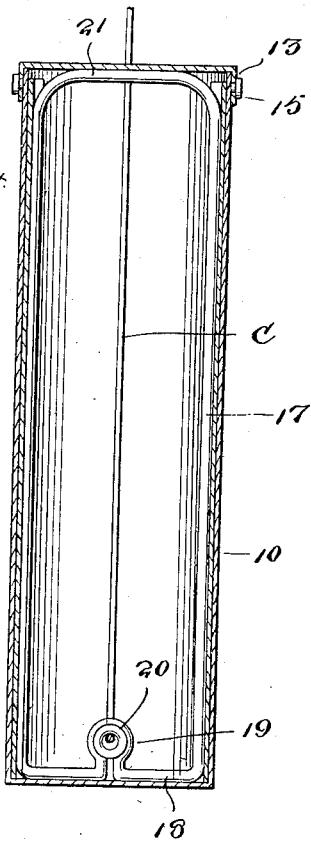
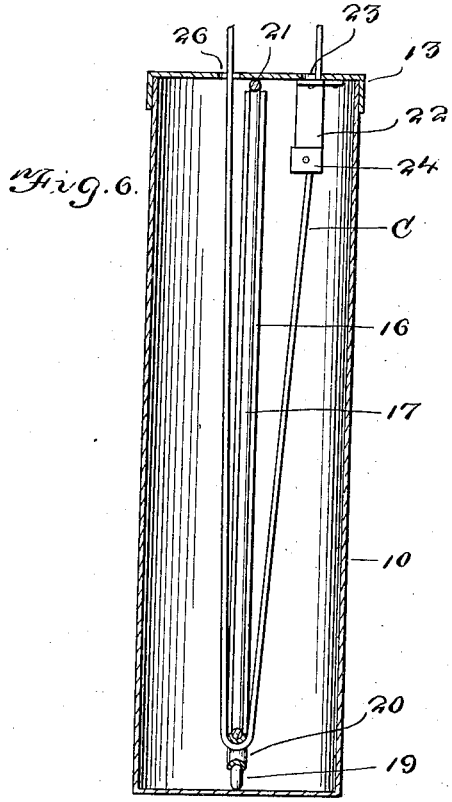
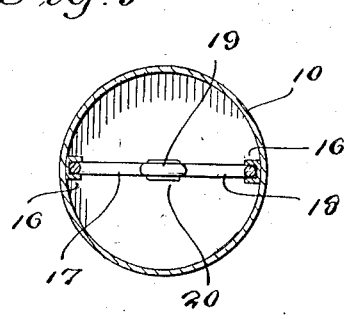
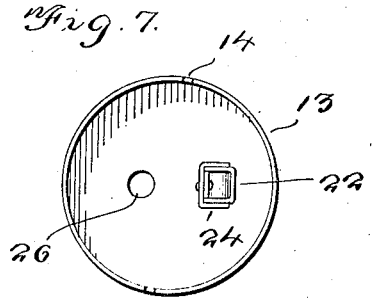
Witnesses
Inventor
E. C. Swartout
By Victor J. Evans
Attorney

UNITED STATES PATENT OFFICE.

EDGAR CARL SWARTOUT, OF FAULKTON, SOUTH DAKOTA.

TWINE-TREATING DEVICE.

1,334,190.  Specification of Letters Patent.  Patented Mar. 16, 1920.

Application filed June 3, 1919. Serial No. 301,377.

*To all whom it may concern:*

Be it known that I, EDGAR C. SWARTOUT, residing at Faulkton, in the county of Faulk and State of South Dakota, have invented new and useful Improvements in Twine-Treating Devices, of which the following is a specification.

This invention relates to attachments for harvesting machines and has for its object the provision of a device adapted to be associated with the twine box of a harvester and through which the twine is adapted to be passed whereby it may be chemically treated so as to insure that the twine upon the bundles of grain will not be gnawed through by insects, thus obviating the very great loss experienced by farmers, especially when the twine used in their harvesting machines is not fresh from the factory.

An important object is the provision of a device of this character which may be clamped upon the side of a twine box in convenient position to have the twine fed continually through the device and through the chemical solution contained therein, the device being furthermore of such size that the length of twine remaining therein after each tying operation on the binder, will be sufficient for the next bundle so as to insure thorough and sufficiently lengthy treatment as to render the twine insect proof.

Another object is the provision of a device of this character provided with means whereby any surplus chemical solution will be automatically removed as the twine passes from the device.

An additional object is the provision of a device of this character which will be simple and inexpensive in manufacture, which may be quickly and easily installed upon a binder, which will be effective in operation, durable in service, and a general improvement in the art.

With the above and other objects and advantages in view, the invention consists in the details of construction to be hereinafter more fully described and claimed, and illustrated in the accompanying drawings, in which—

Figure 1 is a fragmentary view of a harvester showing my device associated with the twine box thereof, Fig. 2 is a side elevation on a larger scale, of my device, Fig. 3 is a plan view thereof showing the clamping members, Fig. 4 is a longitudinal sectional view through my device, Fig. 5 is a cross sectional view, Fig. 6 is a longitudinal sectional view taken at right angles to Fig. 4, Fig. 7 is an inside plan view of the cover, and Fig. 8 is a longitudinal sectional view showing the surplus solution remover in detail.

Referring more particularly to the drawings, the letter A designates a portion of a harvester having the usual twine box B.

In carrying out my invention I provide a cylindrical casing 10 which is disposed outside the twine box B and which is secured thereto by means of suitable clamping members 11 disposed in encircling relation to the twine box and casing 10 and held in clamping engagement by suitable bolts and nuts 12. The casing 10 is provided with a cover 13 secured in place by means of bayonet slots 14 formed in the flange thereof and engaging upon studs 15 carried by the upper end of the casing.

Formed on or secured upon the inner periphery of the casing 10 at diametrically opposite points are longitudinally extending guides 16 and slidably disposed within these guides is an open frame 17 of substantially the same length as the casing 10. The lower cross bar 18 of the frame is provided intermediate its ends with a loop 19 and this loop has preferably secured therein a glass ring 20. The upper cross bar 21 of the frame 17 serves as a handle whereby the frame may be inserted within or removed from the casing 10. It is understood of course that the casing 10 is adapted to be filled to any desired depth with a suitable chemical solution of such a nature that twine saturated therewith will be offensive to insects and will consequently not be destroyed by them.

Secured upon the underside of the cover 13 is an excess solution remover comprising a frame 22 which is U-shaped in cross section and which is secured upon the cover in registration with a hole 23 formed therein. At its lower end, the frame 22 has secured thereon a yoke 24 and secured to this yoke is one end of a leaf spring 25 which is disposed within the frame 22 and which has its other or upper end bearing against the rear closed wall of the frame. The cover 13 is also provided with another hole 26 spaced from the hole 23.

In the use of the device, the operator removes the cover 13, inserts the end of the twine C through the hole 26 therein, grasps the upper cross bar 21 of the frame 17, and pulls upwardly upon the frame so that it will be slid upwardly within the casing 10 sufficiently far that the operator may insert through the glass ring 20 the end of the twine C leading from the twine box B. The operator then holds the end of the twine and shoves downwardly upon the frame 17 until it is returned to its original position, the twine being thus carried down to the bottom of the casing 10. At this time the casing should be partly filled with the solution to be used. The end of the twine is then passed through the yoke 24, the frame 22, between the spring 25 and closed rear wall of the frame 22, and through the hole 23 in the cover. The cover 13 is then placed upon the casing 10 and the bayonet slots 14 engaged upon the studs 15. The end of the twine which then projects above the cover through the hole 23 is then led to the tying mechanism and is used in exactly the same manner as if my device were not present. As the twine is used by the harvester it will be drawn from the twine box B, downwardly into the casing 10 through the glass ring 20 and upwardly through the hole 23 in the cover, being subjected to the action of the treating solution within the casing 10 during its passage therethrough. As the twine leaves the casing 10 the engagement of the spring 25 with the twine will cause the excess liquid soaked up by the twine to be removed as the spring will squeeze out this excess. The twine leaving the casing will pass to the tying mechanism in the ordinary manner.

From the foregoing description and a study of the drawing it will be apparent that I have thus provided a very simple device adapted for permanent association with the twine box of a harvester whereby the twine may be effectively saturated with a chemical solution obnoxious to insects so that the bundles of grain tied by the harvester will be free from the ravages of the insects.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. In combination, a twine treating device comprising a casing containing chemical solution, a frame slidable longitudinally within said casing and carrying a guide loop, twine being engageable through said loop and being guidably held thereby at the bottom of said casing, a cover on said casing provided with a hole for the entrance of said twine and provided with a second hole for the exit of said twine, and means on the underside of said cover at said second named hole for removing surplus solution from said twine.

2. An attachment for the twine box of a harvester comprising a casing containing chemical solution, guides on the internal periphery of said casing at diametrically opposite points, an open frame slidable within said guides and including an upper cross bar serving as a handle, and a lower cross bar having a guide loop formed therein, twine from said twine box being engageable through said loop, a cover for said casing provided with holes for the entrance and exit of the twine, and means for removing surplus solution from the twine.

3. In a device of the character described comprising a casing containing chemical solution and adapted for the passage therethrough of twine, a cover for said casing provided with holes for the passage of said twine, and means at one of said holes for removing surplus solution from said twine comprising a frame secured upon the underside of the cover in registration with the exit hole, said frame being U-shaped in cross section, a yoke secured upon said frame, and a leaf spring secured upon said yoke and bearing against the closed rear side of said frame.

In testimony whereof I affix my signature.

EDGAR CARL SWARTOUT.